United States Patent
Keskes et al.

(10) Patent No.: US 6,636,618 B1
(45) Date of Patent: Oct. 21, 2003

(54) METHOD FOR DETECTING GEOLOGICAL DISCONTINUITY IN AN ENVIRONMENT USING AN OPTICAL FLOW

(75) Inventors: Naamen Keskes, Pau (FR); Fabien Pauget, Pau (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/341,249

(22) PCT Filed: Dec. 4, 1998

(86) PCT No.: PCT/FR98/02625

§ 371 (c)(1),
(2), (4) Date: Jul. 15, 1999

(87) PCT Pub. No.: WO99/30186

PCT Pub. Date: Jul. 17, 1999

(30) Foreign Application Priority Data

Dec. 8, 1997 (FR) .............................. 97 15486

(51) Int. Cl.[7] .................................................. G06K 9/00
(52) U.S. Cl. ...................... 382/109; 348/699; 348/701; 382/197; 382/205; 382/264; 382/268; 702/16; 702/17; 702/18
(58) Field of Search ................................. 382/109, 250, 382/197, 205, 264, 268; 367/73; 702/16–18, 14–15; 348/699–701

(56) References Cited

U.S. PATENT DOCUMENTS

| | | | | | |
|---|---|---|---|---|---|
| 4,972,383 A | * | 11/1990 | Lailly | ........................... | 367/73 |
| 5,287,328 A | * | 2/1994 | Anderson et al. | ............. | 367/38 |
| 5,671,136 A | * | 9/1997 | Willhoit, Jr. | ................. | 702/18 |
| 5,673,207 A | * | 9/1997 | Nomura | ....................... | 348/701 |
| 5,838,564 A | * | 11/1998 | Bahorich | ..................... | 702/16 |
| 5,912,815 A | * | 6/1999 | Kim et al. | ..................... | 700/33 |
| 5,930,730 A | * | 7/1999 | Marfurt et al. | ............... | 702/16 |
| 5,940,778 A | * | 8/1999 | Marfurt et al. | ............... | 702/16 |
| 5,995,904 A | * | 11/1999 | Willen et al. | .................. | 702/14 |
| 6,131,071 A | * | 10/2000 | Partyka et al. | ................ | 702/16 |
| 6,160,919 A | * | 12/2000 | Hale | ........................... | 382/250 |
| 6,401,042 B1 | * | 6/2002 | Van Riel et al. | .............. | 702/17 |

OTHER PUBLICATIONS

Biological Cybernetics; 64 (1991), pp. 177–185; H.A. Mallot, et al.; "Inverse perspective mapping simplifies optical flow computation and obstacle detection".

Artificial Intelligence; 33 (1987); pp. 299–324; H.N. Nagel; "On the estimation of optical flow: relation between different approaches and some new result".

IEEE Transaction on Pattern Analysis and Machine Intelligence; vol. 13, No. 8 (1991); pp. 746–760; K.Y. Wohn, et al.; "A contour–based recovery of image flow: iterative transformation method".

(List continued on next page.)

*Primary Examiner*—Bhavesh M. Mehta
*Assistant Examiner*—Gregory Desire
(74) *Attorney, Agent, or Firm*—Ostrolenk, Faber, Gerb & Soffen, LLP

(57) ABSTRACT

The invention concerns a method for detecting geological discontinuity in an environment using an optical flow. The method includes the steps of selecting in the seismic block a section containing at least one discontinuity. The section constitutes a seismic image. The method includes computing a rough optical flow on the seismic image to obtain a first representation of an optical flow wherein the discontinuity constitutes a moving front. The method also includes smoothing, by a non-supervised dynamic cluster process, the optical flow representation so as to obtain a second optical flow representation wherein the discontinuity shows accentuated contrasts.

5 Claims, 8 Drawing Sheets

OTHER PUBLICATIONS

Figure 1:
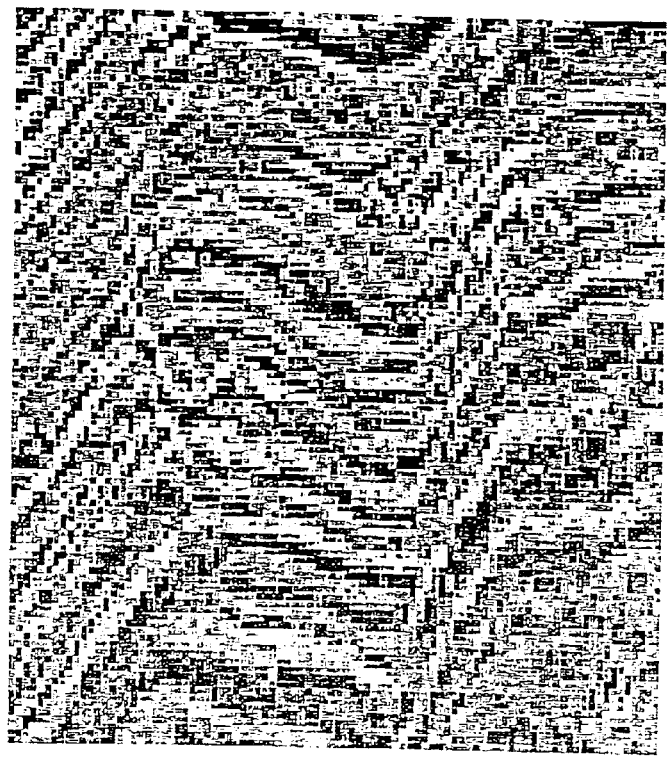

IEEE Transaction on Pattern Analysis and Machine Intelligence; vol. 16, No. 1 (Nov. 1994); pp. 1128–1132; D.P. Kottle, et al.; "Motion estimation via cluster matching".

IEEE Transaction on Pattern Analysis and Machine Intelligence; vol. 14, No. 9 (Sep. 1992); pp. 886–896; J.R. Bergen; "A three frame alogorithm for estimating two component image motion".

Automatic Data Classification (Classification automatique de donnees); Ed. Dunod, 1989, pp. 66–77; DIDAY.

I.L. Herlin, et al., "Image Processing for Sequences of Oceangraphic Images", *The Journal of Visualization and Computer Animation*, vol. 7, 1996, pp. 169–176.

I.L. Herlin, et al., "Performing Segmentation of Ultrasound Images Using Temporal Information", *Proceedings of 1993 IEEE Computer Society Conference on Computer Vision and Pattern Recognition*, Jun. 15–18, 1993, pp. 373–378.

* cited by examiner

FIG 13
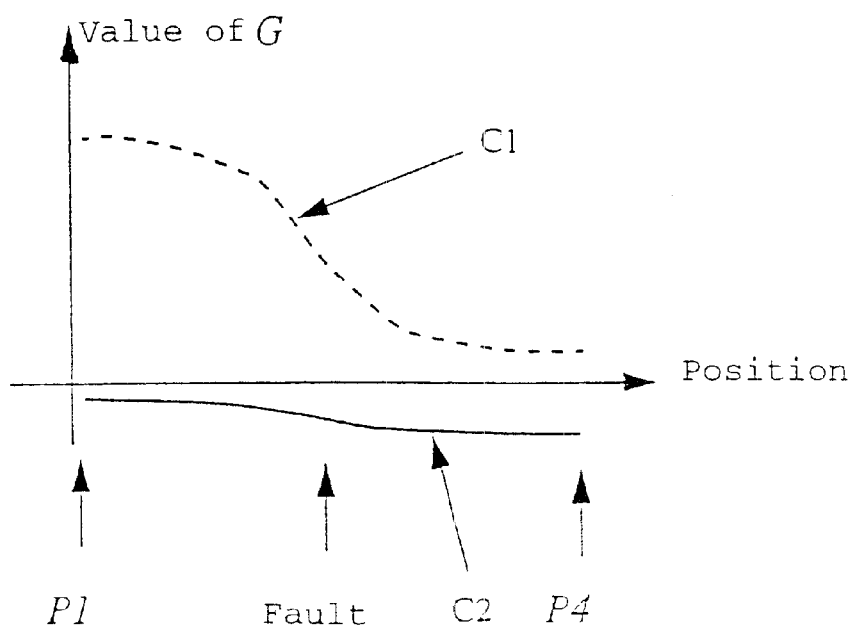
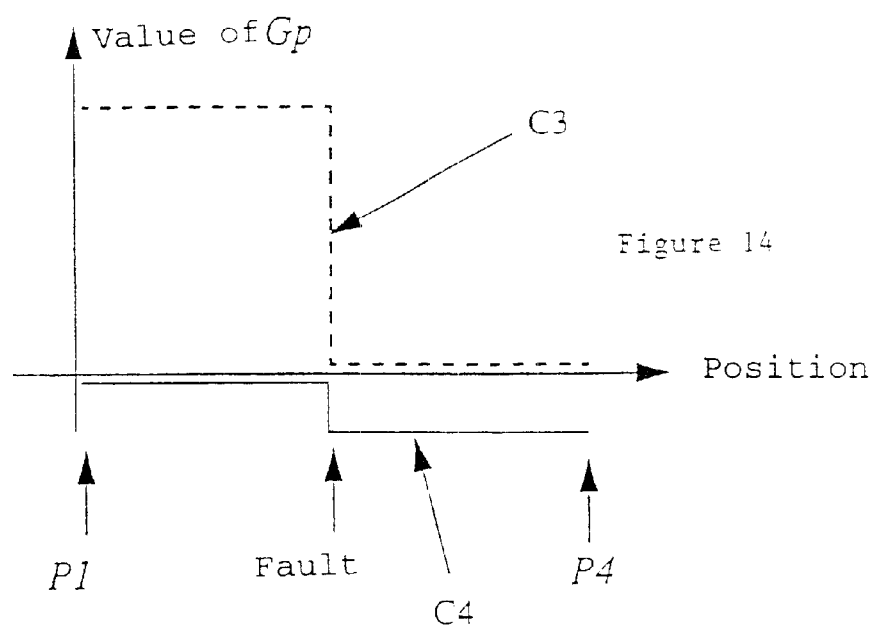
Figure 14

METHOD FOR DETECTING GEOLOGICAL DISCONTINUITY IN AN ENVIRONMENT USING AN OPTICAL FLOW

The present invention relates to a method of detecting a geological discontinuity present in a medium which may be represented in the form of a seismic block or on the basis of several seismic sections of the said medium.

Regardless of the type of seismic campaign in two dimensions (2D) or three dimensions (3D), use is made of one or more wave-emitting sources which are arranged at the surface of the said medium, and receivers, which are likewise arranged at the surface of the said medium and which receive and record the elastic waves reflected off each reflector constituted by the interface between two geological formations of a different nature, the said surface possibly being the surface of the ground or of the sea. The set of recordings obtained makes it possible to produce a representation or image of the medium in 2D or 3D. In general, interference, multiple reflections or artefacts introduce noise, indeterminations, which sometimes render the image of the sub-surface difficult to interpret even after more or less complex processing. Therefore, interpreters do not always succeed in accurately charting and positioning the sought-after structures such as discontinuities constituted in particular by faults, channels, etc. To improve the interpretation of seismic images, specialists interpolate the reliable seismic events detected in neighbouring planes, using in particular the process known as the process of continuity criteria.

When a seismic block representative of the medium to be explored is available it is common to produce an animated display of the seismic block; coherent events, which have some spatial and temporal extent, are distinguished from the surrounding noise, thereby making it possible to eliminate some detection and positioning uncertainties. This is because, during this display, the human eye, via the remanence effect, keeps the image displayed on the retina for a certain time, thereby enabling it to analyse several images of a sequence simultaneously. When a relevant configuration or relevant seismic event, which is visible in an image, is merely an negligible accident, it may be assumed that it will rapidly disappear; conversely, if this configuration represents a fraction of a noteworthy event, then there is a high chance of finding it also in the neighbouring images. Thus, the temporal continuity of events is perceived locally and reliably by the human eye; this continuity never so to speak being oriented in the direction of display, an impression of displacement, of movement, results at every point.

Calculations of optical flow for certain images have been proposed, for example for a conventional sequence of images in which there is just a single direction of intelligible display. Such calculations are defined for example in "Inverse perspective mapping simplifies optical flow computation and obstacle detection" by H. A. MALLOT et al., Biological Cybernetics, 64, 1991, pages 177–185; or in "on the estimation of optical flow: relations between different approaches and some new result" by H. H. NAGEL, Artificial Intelligence, 33, 1987, pages 299–324. The term optical flow is understood to mean a spatial distribution of the apparent velocities which are observed during the animation of a sequence of images. The optical flow, which at every point provides the displacement observed, is therefore one possible representation of dynamic perception.

It should however be noted that such a conventional sequence of images represents a solid, undeformable world in which the concepts of objects, of void and of transparency are omnipresent; moreover, the only direction of intelligible display is the direction of acquisition.

Among the methods which use the calculation of optical flow and are applied to non-seismic images, mention may be made of those which compensate for the lack of local information by interpolating the velocity estimates made at contour level (K. Y. WOHN et al. "A contour-based recovery of image flow: iterative transformation method": IEEE Transactions on Pattern Analysis and Machine intelligence, vol. 13, No. 8, 1991, pages 746–760) or directly over large-size regions (D. P. KOTTLE et al., "Motion Estimation via Cluster Matching": IEEE transaction on Pattern Analysis and Machine Intelligence, vol. 16, No. 1, Nov. 1994, pages 1128–1132). These methods are inaccurate and require expensive prior processing such as contour detection or segmentation into regions. Moreover, the basic images processed via the optical flow are of reduced dimensions.

In a sequence of seismic images, the data are said to be "full" since they represent a part of the interior of a solid, in this instance the sub-surface. In data of these types, all the above concepts are abandoned, there no longer being any void and it being possible for space to be viewed in all directions. Such isotropy provides for the possibility of an infinity of different observations and therefore of a considerable amount of information.

The aim of the present invention is to quantify the dynamic perception given by the calculation of an optical flow of an image by applying it to one or more seismic images so as to accentuate three-dimensional events which are difficult to perceive in a fixed plane and thus ease the work of interpreters.

Seismic images exhibit a textured character by comparison with images consisting of wide monochrome regions, and therefore, the local variations in intensity are relevant at every point. The methods recalled above are ill-suited to the calculation of the optical flow of seismic images.

A subject of the present invention is a method of detecting a geological discontinuity in a seismic block, characterized in that it consists in:

selecting within the seismic block at least one section comprising at least one discontinuity, the said section constituting a seismic image, calculating a raw optical flow over the said seismic image so as to obtain a first representation of the optical flow, in which the discontinuity constitutes a moving front, and in smoothing the said representation of the optical flow by the unsupervised process of dynamic clusters so as to obtain a second representation of the optical flow, in which the said discontinuity exhibits enhanced contrasts.

An advantage of the present invention lies in the fact that the selected smoothing makes it possible to attribute the velocity of highest probability, that is to say the one best represented locally, to each pixel of the basic seismic image.

Smoothing by dynamic clusters leads to relevant results regardless of the spatial configuration of the optical flow and in an unsupervised manner. The conjugate use of optical flow and smoothing by dynamic clusters makes it possible to detect precise and continuous boundaries.

Figure 4:
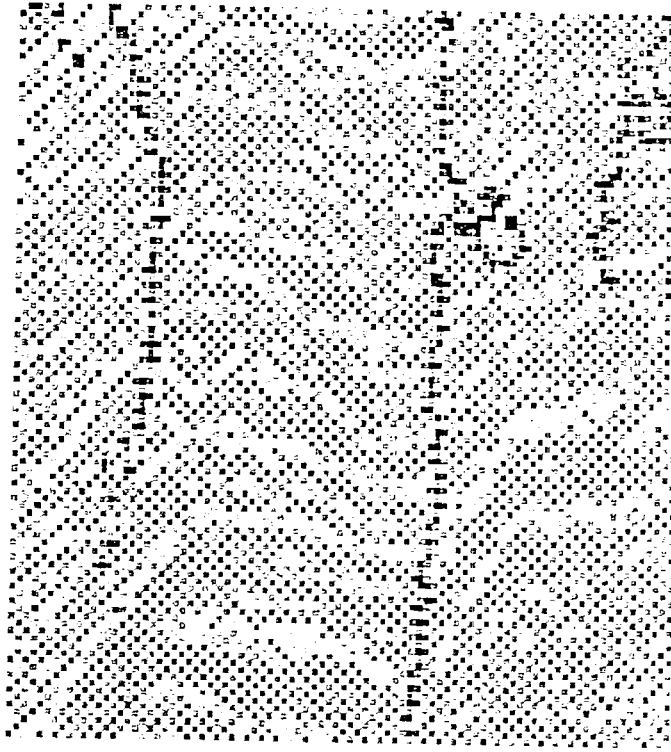
Figure 2:
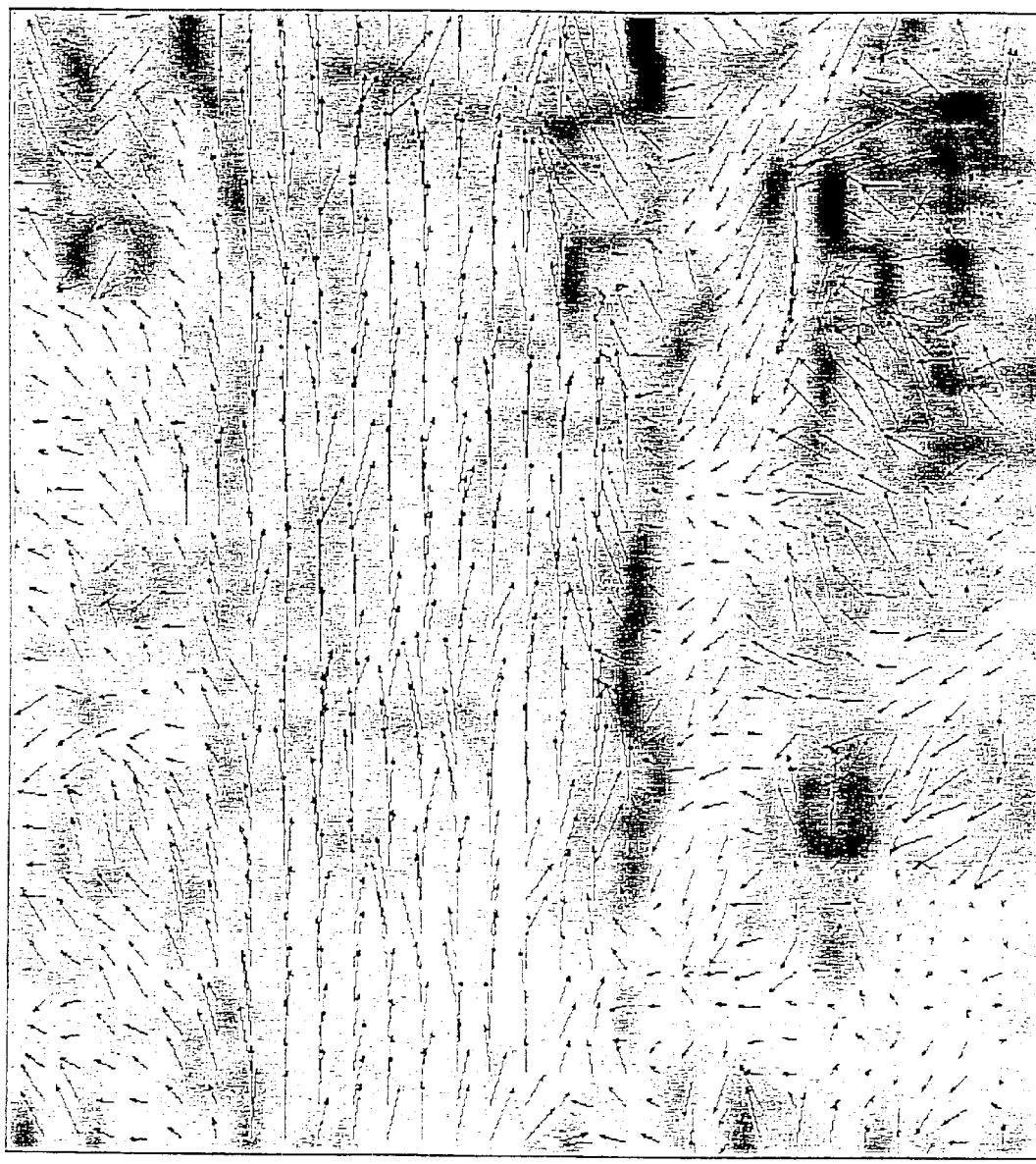
Figure 3:
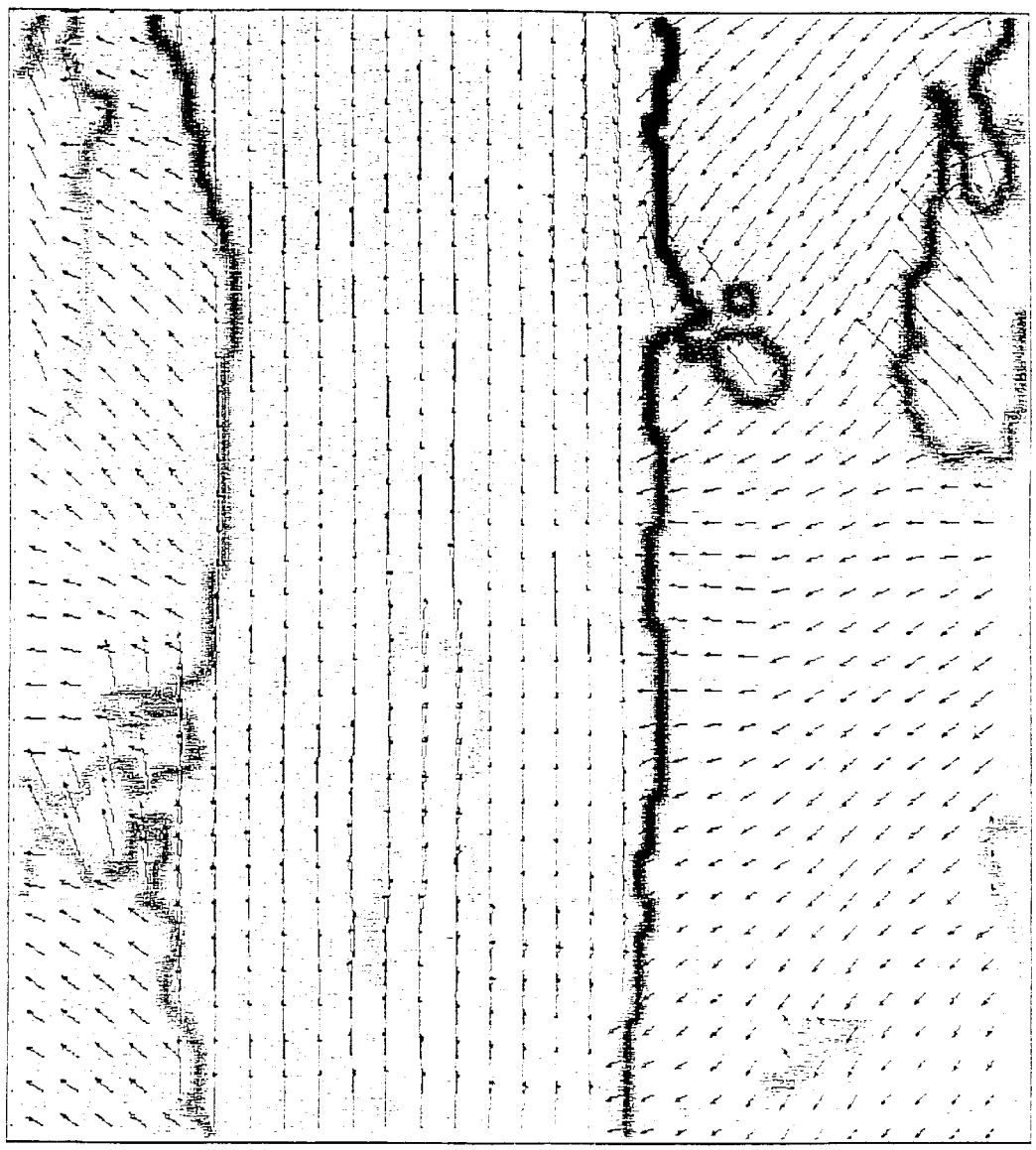

Other advantages and characteristics will emerge more clearly from reading the description of the method according to the invention applied to a discontinuity or seismic event constituted by a fault, as well as the appended drawings in which:

FIG. 1 is a seismic section of the sub-surface of the medium explored;

FIG. 2 is an image or representation of the optical flow calculated over the seismic image of FIG. 1, FIG. 3 is a representation of the image of the optical flow of FIG. 2, after smoothing, FIG. 4 is a representation of the variance of the smoothed optical flow, this variance being superimposed on the seismic section of FIG. 1, FIGS. 5 to 8 partially represent the seismic section of FIG. 1 over which a calculation window is shifted, FIGS. 9 to 12 represent the spread of the clusters of points corresponding to FIGS. 5 to 8 respectively, FIG. 13 represents the behaviour of the components U and V of the velocity obtained following average smoothing along a trajectory $P_1-P_4$, FIG. 14 represents the behaviour of the components U and V of the velocity obtained following smoothing by dynamic clusters along the same trajectory $P_1-P_4$.

The optical flow calculated over a seismic section or seismic image (FIG. 1) obtained from a seismic block containing a seismic event of the discontinuity type, such as a fault, produces a raw optical flow image (FIG. 2) consisting of flow vectors with components U and V. Each optical flow vector corresponds to a pixel of the seismic image. In the optical flow calculated, faults constitute boundaries between regions with different movements.

In the seismic image of FIG. 1, an interpreter regards it as containing two main faults although he is nevertheless unable to specify the edges of the said faults, which are the locus of a moving front as presumed by the calculation of the corresponding optical flow of FIG. 2. However, the spatial variations in the raw optical flow of FIG. 2 are too big for a calculation of variance over the said raw optical flow to be able to reveal these faults correctly.

A first characteristic of the present invention lies in the selection of the mode of calculation of the optical flow to be applied to the seismic section of FIG. 1. According to the invention, preferential selection is given to the calculation which implements the constant-field process as described in the article by J. R. BERGEN et al., entitled "A three frame Algorithm for Estimating Two component Image Motion", published in IEEE Transactions on Pattern Analysis and Machine Intelligence, Vol. 14, No. 9, Sept. 1992, pages 886 to 896.

The formulae which make it possible to calculate the components U and V of the optical flow at every point by the constant-field process are the following:

$$U = \frac{\sum_R (E_x E_y) x \sum_R (E_y E_t) - \sum_R (E_x E_t) x \sum_R (E_y E_y)}{\sum_R (E_x E_x) x \sum_R (E_y E_y) - \sum_R (E_x E_y) x \sum_R (E_x E_y)}$$

$$V = \frac{\sum_R (E_x E_y) x \sum_R (E_x E_t) - \sum_R (E_y E_t) x \sum_R (E_x E_x)}{\sum_R (E_x E_x) x \sum_R (E_y E_y) - \sum_R (E_x E_y) x \sum_R (E_x E_y)}$$

in which:

R is a predetermined neighbourhood which is fixed for each point of the seismic image, $E_x$, $E_y$ and $E_t$ are respectively the intensity gradients in orthogonal directions x, y and t.

Another characteristic of the present invention consists in smoothing the said image of the raw optical flow of FIG. 2, in such a way as to attenuate the spatial variations of the optical flow on each side of the faults, whilst enhancing the contrasts at the level of the said faults.

When searching for faults, the location constraint is paramount and the selected smoothing must consequently preserve, as well as possible, the boundaries delimited by the said faults. Under these conditions, it is understood that filters of the sliding average and gaussian type cannot be applied to the image of the raw optical flow since the local estimate of an average velocity is rather unrepresentative of the field of bipolar vectors characterizing the two dynamic trends at fault level.

According to the present invention, a smoothing which attributes the velocity of highest probability or the one best represented locally to each pixel of the seismic image is applied to the raw optical flow. It has been found that the smoothing which satisfied this condition is unsupervised smoothing by dynamic clusters which gives excellent results, regardless of the spatial configuration of the velocity field.

To implement smoothing by dynamic clusters, we search for the optimal pair (P*,L*) which minimizes the intra-class inertia, in which P is a partition into several classes of the space of investigation which is none other than the space of velocities, and L is a representation of P (by centre of gravity). To do this, iterative use is made, on the one hand, of a representation function g (calculation of the centres of gravity) which makes it possible to calculate L from P known, and on the other hand, of an assignment function f which makes it possible to assign each point in space to the closest centre of gravity and to calculate P from L known. This was developed by DIDAY in "Classification Automatique de données" [Automatic Data Classification], published by DUNOD, 1989, pages 66 to 77.

A scatter of points in the space of investigation generally consists of two main sets at the level of a discontinuity as is apparent in FIGS. 9 to 12. Calculation of the centre of gravity G of the scatter gives an average velocity which fits the scatter poorly. To chart the two dynamic trends or main sets of the scatter, the following procedure is performed.

We start from a representation $L_0$ in which the centres $G_1$ and $G_2$ are very close to the centre of gravity G of the entire scatter containing nb points.

$$\vec{G}_1 = \vec{G} + \vec{\epsilon} \text{ and } \vec{G}_2 = \vec{G} - \vec{\epsilon}$$

where $\vec{\epsilon}$ is a very small velocity vector.

Initialization of the terms required for calculating the centre G2:

nb2=0 Su2=0 SV2=0

Initialization of the counter k: k=0 the centres of gravity G, $G_1$ and $G_2$ which have been calculated according to the above procedure.

Figure 6:
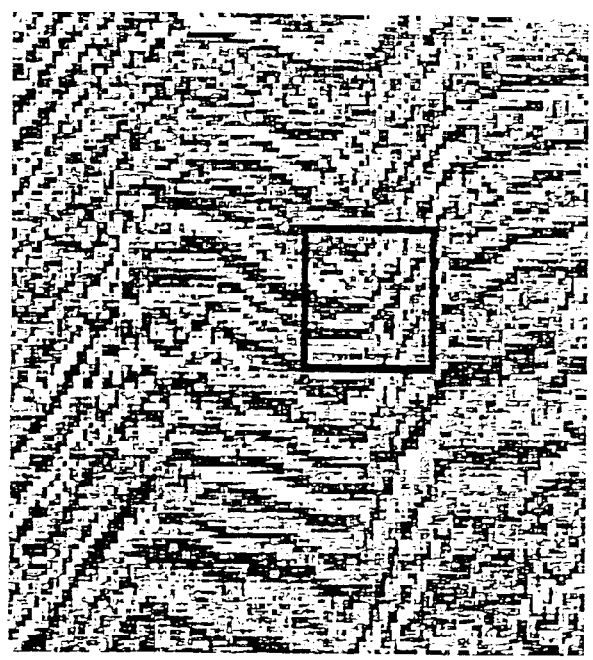
Figure 10:
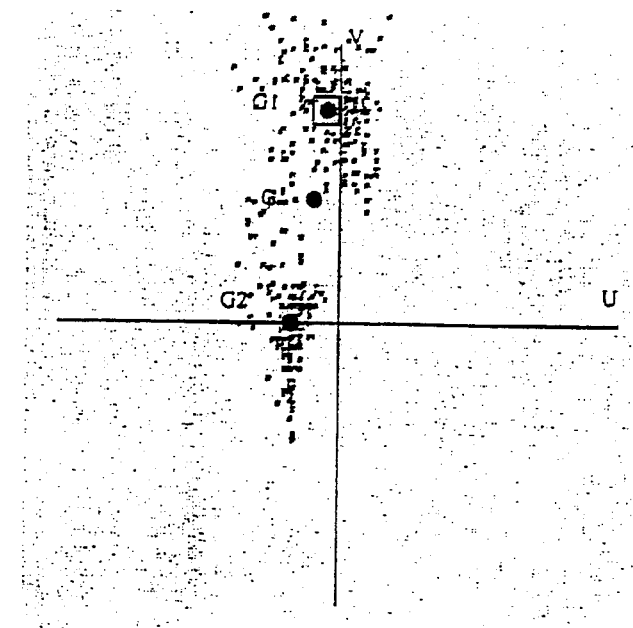

For the position of the window F of FIG. 6, the scatter of points represented in FIG. 10 is obtained with its centre G, the two trends of the scatter being correctly represented in the convergence state by the centres of gravity $G_1$ and $G_2$.

Figure 7:
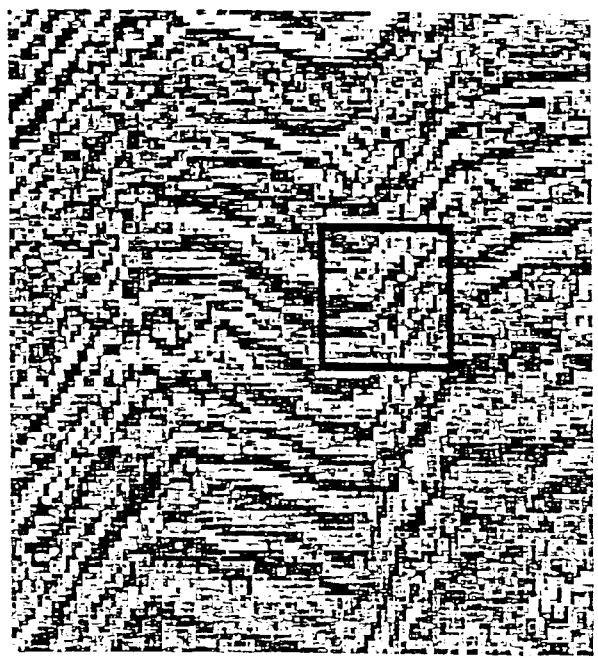

In the same way, for the position of the window F of FIG. 7, we obtain a scatter of points with centre of gravity G and the two main well-separated trends of the said scatter which are correctly represented by the centres of gravity $G_1$ and $G_2$

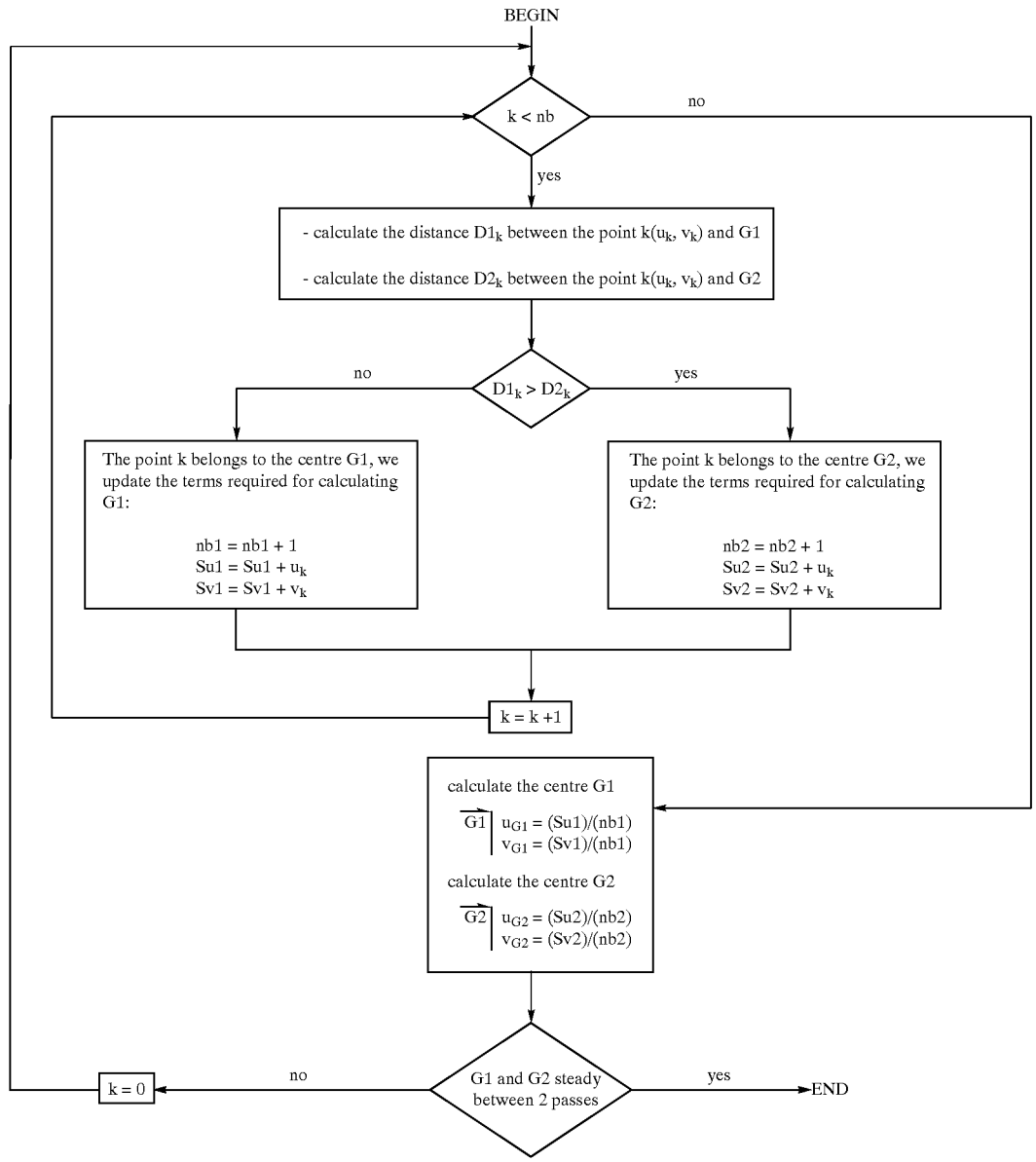

In the seismic section of FIG. 1, a calculation window F is shifted across a fault and occupies the positions of FIGS. 5 to 8 in succession.

Figure 5:
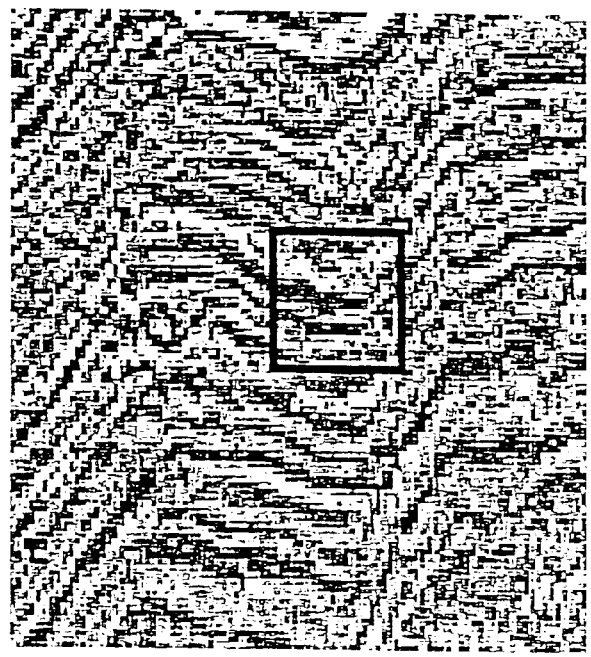
Figure 8:
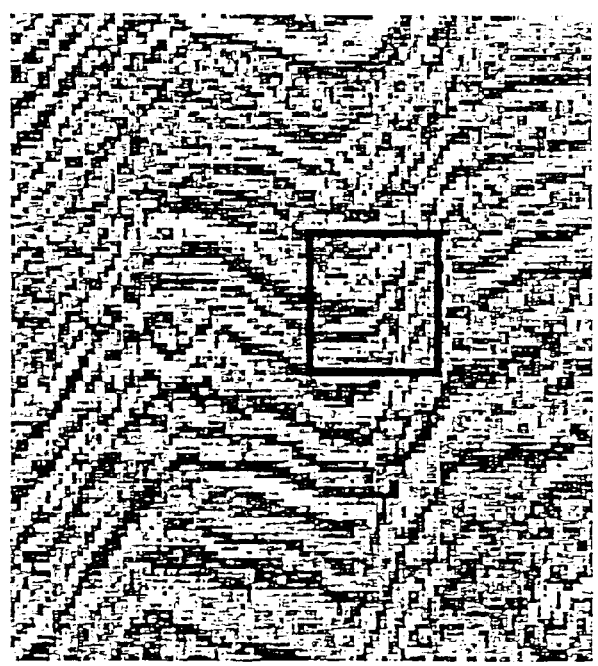
Figure 9:
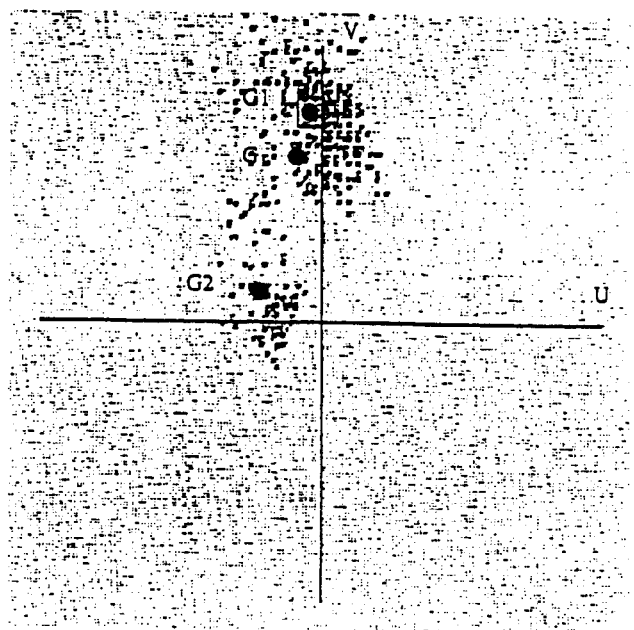
Figure 11:
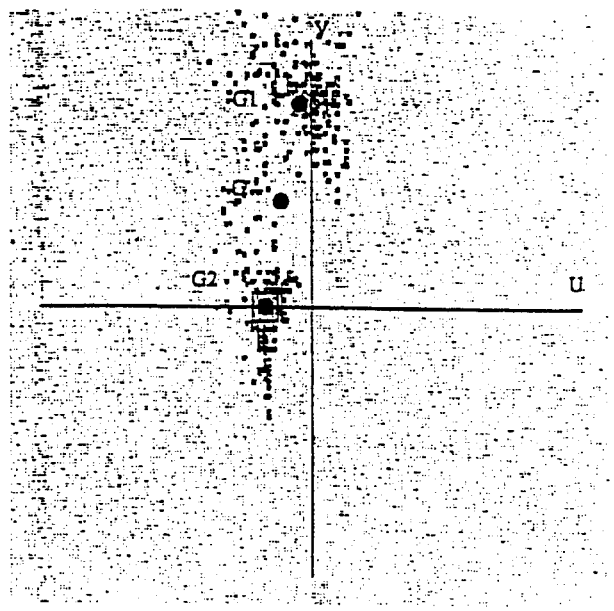
Figure 12:
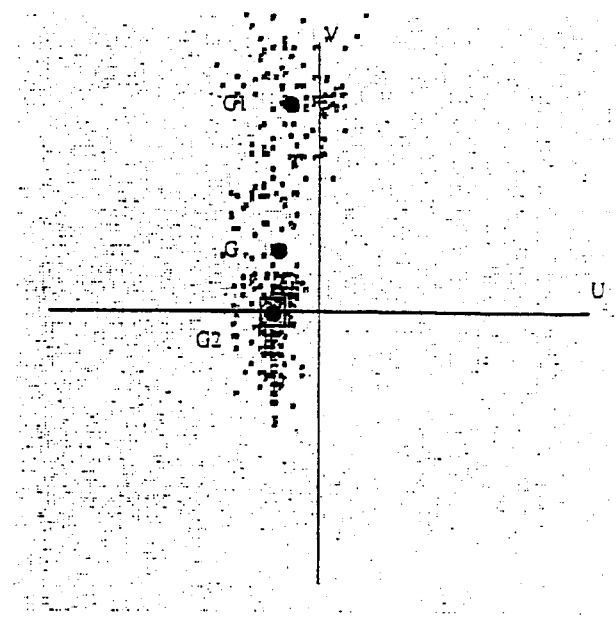

For the position of the window F of FIG. 5, there corresponds the scatter of points of FIG. 9 which represents (FIG. 11); for the position of the window of FIG. 8 we obtain the representation of FIG. 12.

Once the two main trends are charted by their respective centres of gravity, the predominant trend $G_p$ which clumps together the largest number of points is attributed to the central pixel of the relevant window F on the basis of which the scatter has been constructed. Thus, for the scatter of points of FIG. 9, the predominant trend which is attributed to the central pixel of the window F of FIG. 5 is the top trend represented by its centre of gravity $G_1$, framed in FIG. 9. The same is done for each central pixel of window F corresponding to the positions of FIGS. 6 to 8, the predominant trends being represented by their centre of gravity $G_1$ or $G_2$, framed in FIGS. 10 to 12.

Such a selection leads to a relevant estimate based on at least half the points of the scatter and makes it possible to simplify the flow whilst enhancing its discontinuities, since the predominant estimate $G_p$ is significant owing to the fact that it correctly estimates the velocity of the point considered which corresponds to the centre of the window.

Referring again to FIGS. 5 to 12, it may be noted that when the window F overlaps a fault, as is the case in the example of the seismic section of FIG. 1 and partially reproduced in FIGS. 5 to 8, the velocity space is split into two. On transferring progressively from the position of the window F of FIG. 5 to FIG. 8, the dynamic clusters of points correctly separate the velocity space even when one of the two main trends is broadly dominant, as is the case in FIGS. 9 and 12. Therefore, the left side of the fault receives a practically constant predominant estimate $G_1$ (FIGS. 9 and 10), whilst the right side of the fault will receive a substantially constant predominant estimate $G_2$ (FIGS. 11 and 12). The resulting flow is, consequently, almost constant at the fault border.

If straightforward average smoothing had been performed on only the centre of gravity G of each scatter of points along a trajectory intersecting the fault and determined by the ends $P_1$ and $P_4$, a smooth velocity field with poorly defined contours would have been obtained, as is represented in FIG. 13. The dashed curve $C_1$ represents the value of the average velocity G as a function of the position of the points of the trajectory between $P_1$ and $P_4$, the variation in G being progressive between $P_1$ and $P_4$. The associated contour of the fault is given by curve $C_2$. It is noted that it is difficult to position a fracture.

On the other hand, the smoothing by dynamic clusters according to the present invention renders the optical flow uniform in each of the zones situated on either side of the fault and enhances the contours of the said fault as shown by FIG. 14 where it may be seen that the curve $C_3$ representing the behaviour of the predominant trend $G_p$ along the same trajectory, between the points $P_1$ and $P_4$, exhibits abrupt changes. It should be noted that the locally adopted velocity $G_p$ is almost constant on either side of the fault and it changes abruptly at the level of the said fault. This may be seen clearly in curve $C_4$ where a precise and easily detectable step contour is noted.

The step contours thus created on each occasion are located by calculating the variance over the flow processed, performed with the aid of the following formula:

$$v = \sum_{k=1}^{nb} [(v_k - \bar{v})^2 + (u_k - \bar{u})^2]$$

in which:

$u_k$ and $v_k$ are the components of the nb velocity vectors contained in the neighbourhood H taken into consideration, the neighbourhood H containing nb points and being centred on the point over which the variance is calculated.

The importance of the present invention will be shown with the aid of an exemplary embodiment.

The seismic section of FIG. 1 is traversed by two main faults which are the locus of a moving front. Calculation of the raw optical flow over the image of FIG. 2 shows that the spatial variations of the raw optical flow are too big for the variance calculated in the said raw optical flow to enable the said faults to be correctly delimited. Unsupervised smoothing by dynamic clusters attenuates the spatial variations of the optical flow outside of the discontinuities and enhances them at the level thereof, as shown by FIG. 3 in which the contours are sharp at the level of the said faults, the intensity representing the variance calculated over the respective optical flows; the darker the pixel, the bigger the variance.

Represented in FIG. 4 is the variance of the smoothed optical flow, superimposed on the section of FIG. 1 whose contrast has been attenuated, the said variance accentuating the significant boundaries which, for the most part, define the said faults.

Among the advantages of the present invention which follow from the description given above may be cited that lying in the fact that it is possible to pinpoint within a seismic section or a given image the points suitable for defining discontinuities such as faults, and hence serving as a guide to the interpreter when formulating the geological model.

Furthermore, the conjugate use of optical flow and dynamic cluster smoothing makes it possible to determine a useful segmentation of the seismic data and therefore constitutes an effective aid to the interpretation of seismic sections for example.

What is claimed is:

1. Method of detecting a geological discontinuity in a seismic block, characterized in that it consists in:
   selecting within the seismic block at least one section comprising at least one discontinuity, said section constituting a seismic image,
   calculating a raw optical flow over said seismic image so as to obtain a first representation of the optical flow, in which the discontinuity constitutes a moving front, and in,
   smoothing said representation of the optical flow by unsupervised dynamic clusters so as to obtain a second representation of the optical flow, in which said discontinuity exhibits enhanced contrasts.

2. Method according to claim 1, characterized in that it furthermore consists in locating the edges of the said discontinuity by means of a variance calculation performed on the second representation of the optical flow.

3. Method according to claim 1, characterized in that the calculation of the raw optical flow uses the intensity gradient.

4. Method according to claim 3, characterized in that the components of the optical flow are calculated at every point of the seismic image by the constant-field process.

5. Method according to claim 1, characterized in that the components of the optical flow are calculated at every point of the seismic image by the constant-field process.

* * * * *